US008383197B2

(12) United States Patent
La Forest et al.

(10) Patent No.: US 8,383,197 B2
(45) Date of Patent: Feb. 26, 2013

(54) TITANIUM CARBIDE OR TUNGSTEN CARBIDE WITH COMBUSTION SYNTHESIS TO BLOCK POROSITY IN C-C BRAKE DISCS FOR ANTIOXIDATION PROTECTION

(75) Inventors: Mark L. La Forest, Granger, IN (US); Allen H. Simpson, Buchanan, MI (US); Slawomir Fryska, Granger, IN (US); Alexander Mukasyan, Granger, IN (US)

(73) Assignees: Honeywell International Inc., Morristown, NJ (US); University of Notre Dame Du Lac, Notre Dame, IN (US)

( * ) Notice: Subject to any disclaimer, the term of this patent is extended or adjusted under 35 U.S.C. 154(b) by 324 days.

(21) Appl. No.: 12/473,857

(22) Filed: May 28, 2009

(65) Prior Publication Data

US 2010/0304038 A1    Dec. 2, 2010

(51) Int. Cl.
*B05D 1/12* (2006.01)
*B05D 3/14* (2006.01)

(52) U.S. Cl. ......... 427/191; 427/202; 427/228; 427/337
(58) Field of Classification Search .................. 427/191, 427/202, 228, 337
See application file for complete search history.

(56) References Cited

U.S. PATENT DOCUMENTS

| | | | |
|---|---|---|---|
| 4,815,572 A * | 3/1989 | Froberg et al. ............ 188/251 M |
| 5,401,440 A | 3/1995 | Stover et al. | |
| 5,652,030 A | 7/1997 | Delperier et al. | |
| 5,759,622 A * | 6/1998 | Stover ................. 427/249.15 |
| 5,853,821 A * | 12/1998 | Balhadere et al. ........... 427/601 |
| 6,001,419 A | 12/1999 | Leluan et al. | |
| 6,221,475 B1 | 4/2001 | Domergue et al. | |
| 6,361,722 B1 | 3/2002 | Theys et al. | |
| 6,551,709 B1 | 4/2003 | Stover | |
| 7,001,544 B2 | 2/2006 | Shin et al. | |
| 7,332,195 B2 | 2/2008 | Arico et al. | |
| 2001/0019752 A1 | 9/2001 | Purdy et al. | |
| 2006/0008647 A1 | 1/2006 | Walker et al. | |
| 2006/0263525 A1 | 11/2006 | Sion et al. | |
| 2007/0154712 A1 | 7/2007 | Mazany et al. | |
| 2007/0199626 A1 | 8/2007 | Diss et al. | |
| 2007/0218208 A1 | 9/2007 | Walker et al. | |
| 2008/0090064 A1 | 4/2008 | James et al. | |

FOREIGN PATENT DOCUMENTS

| | | |
|---|---|---|
| EP | 1 889 822 A2 | 2/2008 |
| EP | 2 103 832 A1 | 9/2009 |
| EP | 2 128 479 A1 | 12/2009 |
| EP | 2 189 677 A1 | 5/2010 |
| WO | WO-97/42135 A1 | 11/1997 |

* cited by examiner

*Primary Examiner* — Frederick Parker
(74) *Attorney, Agent, or Firm* — Shumaker & Sieffert, P.A.

(57) ABSTRACT

A metal powder is applied to the surface of the area of a carbon-carbon composite brake disc to be protected against migration of antioxidant. The metal powder may be titanium powder or tungsten powder. A chemical reaction between the metal powder and carbon is then initiated by heating the powder-coated brake to the ignition temperature via application of electric current (Joule preheating) or by heating it in a furnace. Upon combustion, the metal particles react with carbon in the composite, forming liquid carbide that flows into pores of the composite brake disc to be protected.

17 Claims, No Drawings

TITANIUM CARBIDE OR TUNGSTEN CARBIDE WITH COMBUSTION SYNTHESIS TO BLOCK POROSITY IN C-C BRAKE DISCS FOR ANTIOXIDATION PROTECTION

FIELD OF THE INVENTION

This invention relates to oxidation-resistant coating systems for carbon-carbon composites. This invention also contemplates methods for the preparation of the oxidatively protected composites. This invention is of particular utility in the field of aircraft braking systems.

BACKGROUND OF THE INVENTION

Carbon-carbon composites are a class of unique materials whose properties, especially at elevated temperatures, make them attractive for various aerospace applications. The materials are composites, although often all the composite elements are comprised essentially of carbon in its various allotropic forms. Factors such as the degree of graphitization, purity, pore structure, specific surface areas, surface complexes, oxygen availability, and temperature have a strong influence on the oxidation of carbon materials. Oxidation of carbon-carbon composites at elevated temperatures in an atmospheric environment has a catastrophic effect on the mechanical properties of the composites. Some form of oxidation protection is required in order to maintain structural capability. Much effort has been expended to develop technologies for preventing carbon oxidation. The following publications exemplify such technologies.

US 2007/0218208 A1, entitled BI- OR TRI-LAYER ANTI-OXIDATION SYSTEM FOR CARBON COMPOSITE BRAKES, describes a technology that provides a method of protecting a carbon-carbon composite brake disc or a carbon-carbon-silicon carbide composite brake disc against oxidation. The method includes: coating the composite brake disc with a first phosphoric acid-based penetrant system; curing the penetrant coating at 200° C. or above to form a first coating on the disc; applying a ceramic coating over the first coating and curing the ceramic coating at a temperature below 200° C. to form a second coating on the disc; and optionally coating the coated composite brake disc so obtained with a second phosphoric acid-based penetrant system, which would be cured at 200° C. or above to form a third coating.

US 2007/0154712 A1, entitled OXIDATION INHIBITION OF CARBON-CARBON COMPOSITES, describes a technology in which a barrier coating may be applied to a surface of a carbon-carbon composite prior to or subsequent to treatment with an oxidation inhibiting composition and/or pretreating composition. The barrier coating materials include carbides or nitrides, such as boron nitride, silicon carbide, titanium carbide, boron carbide, silicon oxycarbide, silicon nitride, and mixtures thereof.

US 2007/0199626 A1, entitled PROTECTION AGAINST THE OXIDATION OF COMPOSITE MATERIAL PARTS CONTAINING CARBON AND PARTS THUS PROTECTED, describes a technology that provides a part made of a composite material containing carbon, having an open internal residual porosity. The part is protected against oxidation by applying an impregnating composition, said impregnating composition containing a metal phosphate and titanium diboride. Efficient protection against oxidation is thus obtained at temperatures of more than 1000° C., even in the presence of carbon oxidation catalysts and moist conditions.

WO 1997/042135 A1, entitled IMPROVED OXIDATION PROTECTION FOR CARBON/CARBON COMPOSITES AND GRAPHITES, discloses a technology which improves oxidation resistance of carbon-carbon composites by application of colloidal silica to a surface of the composite and converting same to silicon carbide via reaction with the substrate during heat treatment.

Conventional antioxidant systems for carbon-carbon composite brake discs—including some of those discussed above—may fail due to temperature of use, runway de-icers, and humidity. In some cases, these factors cause the antioxidant to migrate within the carbon-carbon composite, which can lead to detrimental effects oxidation protection effectiveness and braking performance.

SUMMARY OF THE INVENTION

The present invention addresses this problem by blocking porosity in the carbon-carbon composite brake discs, thereby preventing the anti-oxidant composition from migrating through the porosity of the discs. In accordance with the present invention, a metal powder is applied to the surface of the area of the carbon-carbon composite brake disc to be protected. The metal powder may be titanium powder or tungsten powder. A chemical reaction between the metal powder and carbon is then initiated by heating the brake to the so-called ignition temperature via application of electric current (Joule preheating) or by heating it in a furnace. Upon combustion, the metal particles react with carbon in the composite, forming liquid carbide that flows into pores of the composite materials to be protected.

In one embodiment, this invention provides a method of protecting a carbon-carbon composite brake disc against migration of anti-oxidant composition through the porosity of the composite brake disc. The method comprises: providing a porous carbon-carbon composite brake disc; applying a metal powder, selected from the group consisting of titanium powder and tungsten powder, to a surface area of the carbon-carbon composite brake disc to be protected; instituting a chemical reaction by the application of electric current to the powdered metal, or by heating the powdered metal to its melting point, thereby instituting a combustion reaction which forms titanium carbide or tungsten carbide within the pores of said surface area of the carbon-carbon composite brake disc; and subsequently applying an anti-oxidant solution to the non-friction surfaces of the resulting carbon-carbon composite brake disc.

The average diameter of the titanium or tungsten powder particles ranges from 10 to 300 microns, preferably from 20 to 200 microns.

When an electrical current is employed to initiate the combustion reaction, it can be an electrical current in the range 500-1000 Amp. The current can be applied for 2-10 seconds, with shorter times being employed when higher amperages are used.

In the option of heating the powdered metal to its melting point in order to institute the combustion, reaction, when the metal powder is titanium powder, the combustion reaction begins at approximately 1725° C., and when the metal powder is tungsten powder, the combustion reaction begins at approximately 3422° C.

In a related embodiment, this invention provides a method of manufacturing an aircraft brake disc which comprises the steps of: providing a carbon-carbon composite aircraft brake disc with its non-friction surface presented in a horizontal plane to define an upper flat surface; dusting tungsten or titanium particles having an average diameter of 20 microns onto said flat surface; placing the upside down, powder-coated brake disc into a preheated oven having an inert atmosphere; initiating a combustion reaction comprising a reaction between the tungsten or titanium and carbon present in the composite aircraft brake disc, said combustion reaction forming tungsten carbide or titanium carbide in liquid form; permitting the liquid tungsten carbide or titanium carbide to flow into pores in said flat surface of the composite brake disc; and permitting the liquid tungsten carbide or titanium carbide to solidify within said pores, thereby imparting to said flat surface of the carbon-carbon composite aircraft brake disc a resistance to potential migration of anti-oxidant composition through the porosity of the composite brake disc.

In a composition-of-matter embodiment, this invention provides aircraft landing system brake discs which are manufactured by the foregoing methods.

DETAILED DESCRIPTION OF THE INVENTION

It should be understood that the detailed description and specific examples which follow, while indicating preferred embodiments of the invention, are given by way of illustration only, since various changes and modifications within the spirit and scope of the invention will become apparent to those skilled in the art as a result of this detailed description.

The particle size of the tungsten or titanium powders to be used in the present invention should be small, in order to create a large powder surface area that will support a rapid combustion reaction. Generally, the average diameter of the titanium or tungsten powder particles will range from 10 to 300 microns. A typical specific example would be titanium powder particles having an average diameter of about 45 microns. Such powders can be prepared as needed, but they are commercially available from a variety of sources, including Alfa Aesar (a Johnson Matthey Company) of Ward Hill, Mass.

Combustion of the powder on the carbon-carbon composite is conducted in an inert atmosphere—typically, argon, although helium or other inert gases including nitrogen may likewise be employed.

To effect conversion of the metal into a carbide, an electrical current may be applied to the powder-coated carbon-carbon composite brake disc in order to preheat the metal layer up to ignition temperature to begin a combustion reaction. A typical electric current would be 600 Amps applied for 5 seconds. The current is preferably applied in one of two ways. In one approach, an electrically conductive roller travels along the surface of the composite where the metal was applied and creates a strong localized current. The roller will have a fairly short life span, due to the heat which it would encounter. In another approach, the heat is applied by an electric arc, similar to an arc welder. Typically, a graphite welding electrode can be used. This would begin a reaction at a point and the combustion front will propagate along the brake surface. Alternatively, the electrode can travel along the surface of the composite, completing the reaction as it travels. The reaction will start when the metal reaches its melting point. Until the metal reaches its melting point, it will be inert with respect to the carbon in the composite. The metal-carbon reaction, once started, is highly exothermic, and has an adiabatic combustion temperature of over 3000° C. The product of the reaction is, for instance, titanium carbide at a temperature so high that the TiC is in liquid form.

The powder mixture may be placed on the area to be protected by any convenient method. For instance, an aircraft brake disc can be situated upside down in a horizontal plane, and the metal powder can be shaken out onto the flat surface (underside of the brake disc) from a "salt shaker" type dispenser.

Upon combustion, small amounts of the liquid metal carbide will flow into the pores of the composite pieces. The operator will normally distribute the powder mixture as evenly as possible. However, a precisely uniform layer of powder is not essential, because upon combustion, the liquefied powder tends to flow evenly across the horizontal surface and into pores of the composite materials being protected. The heat of the reaction is rapidly absorbed by the carbon-carbon composite, lowering the temperature of the reaction product. As the liquid reaction product material cools below the melting point of the carbide, the liquid "freezes", bonding the metal carbide (that is, silicon carbide, titanium carbide, or tungsten carbide) layer into the carbon-carbon composite piece.

Once the carbon-carbon composite brake disc is protected in this manner, antioxidant solutions may be applied to it in a conventional manner. Application of antioxidant solutions may be conducted as follows.

Application of Antioxidant Protection

First, the C—C composite component is fabricated into a desired shape. The present invention is particularly valuable when the C—C composite component is an aircraft landing system brake disc. Carbon-carbon composites are generally prepared from carbon preforms. Carbon preforms are made of carbon fibers, formed for instance from fibers of pre-oxidized polyacrylonitrile (PAN). These fibers can be layered together to form shapes, such as friction brake discs, which shapes are then heated and infiltrated with methane or another pyrolyzable carbon source to form the C—C composite preforms. Carbon-carbon composites useful in accordance with the present invention typically have densities in the range of from about 1.6 g/cm$^3$ through 2.0 g/cm$^3$. Methods of manufacturing C—C composites are generally well known to those skilled in the art. A good reference in this area is: Buckley et al., *Carbon-Carbon Materials and Composites*, Noyes Publications, 1993. The entire contents of this publication are hereby expressly incorporated by reference.

For purposes of illustration only, the C—C composite component may be fabricated from woven fabric panes of pitch-based Amoco P30X carbon fiber tows in a harness satin weave or from a pitch-based Nippon XNC25 in a plain weave. The tows are rigidized with a few weight-% carbon-containing resin, such as epoxy Novolac. The material is then carbonized at a temperature in the range of 800-1000° C. and densified by carbon CVD. The resulting materials is then annealed in an inert gas at a temperature in the range of 1600-2600° C. This process creates a C—C composite component that is adaptable for use in high temperature environments when it is properly protected against oxidation. It is understood that the oxidation protective coating system of the present invention is applicable to C—C composite components regardless of how the C—C composite components are fabricated.

The C—C component preform is immersed or dipped in a liquid penetrant solution for several minutes. Preferred precursors for use in applying the undercoating layer in accordance with the present invention are phosphoric acid-based penetrant salt solutions, which are described in detail in U.S. Pat. No. 6,455,159 B1, the entire disclosure of which is hereby expressly incorporated by reference. A typical penetrant salt solution that can be used to form the undercoating herein could contain from 5-80 wt % $H_2O$, 10-70 wt % $H_3PO_4$, up to 25 wt % alkali metal mono-, di-, or tri-basic phosphate, and up to 2 wt % $B_2O_3$. The typical penetrant salt solution will also include at least one of $MnHPO_4 \cdot 1.6H_2O$, AlPO$_4$, and Zn$_3$(PO$_4$)$_2$, in weight-percentages up to 25 wt-%, 30 wt-%, and 10 wt-%, respectively.

In accordance with the present invention, the surface of the carbon-carbon composite or graphitic material is treated with the penetrant solution by painting, dipping, or other conventional application techniques. Subsequently, the surface-treated material is cured at a temperature in the range of 250-900° C. Typically, the surface is treated with one to three coats of the penetrant solution, and the peak temperature is generally held for one to six hours.

The composite component bearing the undercoating is immersed in a fluidized precursor bath or painted with the fluidized precursor to cover the undercoated component with an overcoating. The overcoating may comprise 60-80 wt-% silicate binder (e.g., composed of alkali or alkaline earth metal silicates), up to 20 wt-% alkali metal hydroxide (typically potassium hydroxide or sodium hydroxide) as a pH modifier, and 10-30 wt-% particulate silicon carbide. Cerama-Bind 830, manufactured by Aremco Products, Inc. of Valley Cottage, New York, is a commercially available example of a product which may be used as the silicate binder. Cerama-Bind 830 is a water-miscible silicate-based binder solution. In accordance with a preferred embodiment of this invention, the silicon carbide particles will be submicron size. That is, the silicon carbide particles employed to make the overcoating will range in average diameter e.g. from 0.05 to 0.5 microns. A commercially available example of a product which may be used as the particulate silicon carbide component of the present invention is Silicon Carbide Item #44647, a 0.1-0.2 micron silicon carbide powder available from Alfa Aesar (a Johnson Matthey Company) of Ward Hill, Massachusetts. A specific embodiment of the overcoating layer in accordance with this invention could contain 71.2 weight-% Cerama-Bind 830, 9 weight-% potassium hydroxide, and 19.8 weight-% sub-micron particle size silicon carbide, 325 mesh, from Alfa Aesar.

The C—C component with its solid glass undercoating is immersed or dipped in a liquid bath precursor of fluidized silicon carbide-particle suspension for several minutes. The liquid precursor is maintained at a temperature in the range of approximately 20-90° C. The component may be rotated relative to the liquid precursor to improve the wetting characteristics and uniformity of the coating.

The fluidized SiC particles-silicate-hydroxide-containing coating is converted to a solid coating by air-drying at ambient temperatures. If desired, drying may be accelerated by gentle heating. This results in completely coating the composite, and, with the solid glass coating, a protective barrier against undesirable oxidation of C—C component.

EXAMPLES

Example 1

An aircraft brake disc is turned upside down in a horizontal plane, and titanium particles having an average diameter of 100 microns are dusted onto the flat surface (the underside of the brake disc) from a "salt shaker" type dispenser. Meanwhile, an oven having an inert (argon) atmosphere is preheated to 1800° C. The upside down, powder coated brake disc is placed into the oven, whereupon combustion occurs. Combustion raises the temperature at the surface of the brake disc dramatically, to more than 3000° C. The combustion is a chemical reaction between the titanium and carbon in the carbon-carbon composite brake disc. The product of the combustion is titanium carbide. The titanium carbide formed in this way is liquid, and small amounts of the TiC melt flows into pores in the underside surface of the composite brake disc. The heat of the reaction is rapidly absorbed by the carbon-carbon composite, lowering the temperature of the reaction product. As the liquid reaction product material cools below 2500° C., the liquid "freezes", bonding the titanium carbide into the pores of the carbon-carbon composite brake disc. Once the carbon-carbon composite brake disc is protected in this manner, antioxidant solution is applied to it in the manner described above.

Example 2

An aircraft brake disc is turned upside down in a horizontal plane, and tungsten particles having an average diameter of 45 microns are dusted onto the flat surface (the underside of the brake disc) from a "salt shaker" type dispenser. The upside down, powder coated brake disc is placed into an oven having an inert (nitrogen) atmosphere. An electrical current is applied to the powder-coated carbon-carbon composite brake disc in order to begin a combustion reaction. The electric current is 500 Amps, which is applied for 10 seconds. Combustion occurs spontaneously and raises the temperature at the surface of the brake disc to more than 3000° C. The combustion is a chemical reaction between the tungsten and carbon in the carbon-carbon composite brake disc. The product of the combustion is tungsten carbide. The tungsten carbide formed in this way is liquid, and small amounts of the WC melt flows into pores in the underside surface of the composite brake disc. The heat of the reaction is rapidly absorbed by the carbon-carbon composite, lowering the temperature of the reaction product. As the liquid reaction product material cools below 2500° C., the liquid "freezes", bonding the tungsten carbide into the pores of the carbon-carbon composite brake disc. Once the carbon-carbon composite brake disc is protected in this manner, antioxidant solution is applied to it in the manner described above.

Example 3

An aircraft brake disc is turned upside down in a horizontal plane, and titanium particles having an average diameter of 45 microns are dusted onto the flat surface (the underside of the brake disc) from a "salt shaker" type dispenser. The upside down, powder coated brake disc is placed into a chamber having an inert (argon) atmosphere. An electrical current is applied to the powder-coated carbon-carbon composite brake disc in order to begin a combustion reaction. The electric current is 700 Amps, which is applied for 4 seconds. Combustion occurs spontaneously and raises the temperature at the surface of the brake disc to more than 3000° C. The combustion is a chemical reaction between the titanium and carbon in the carbon-carbon composite brake disc. The product of the combustion is titanium carbide. The titanium carbide formed in this way is liquid, and small amounts of the TiC melt flows into pores in the underside surface of the composite brake disc. The heat of the reaction is rapidly absorbed by the carbon-carbon composite, lowering the temperature of the reaction product. As the liquid reaction product material cools below 2500° C., the liquid "freezes",bonding the titanium carbide into the pores of the carbon-carbon composite brake disc. Once the carbon-carbon composite brake disc is protected in this manner, antioxidant solution is applied to it in the manner described above.

Example 4

An aircraft brake disc is turned upside down in a horizontal plane, and tungsten particles having an average diameter of 20 microns are dusted onto the flat surface (the underside of the brake disc) from a "salt shaker" type dispenser. Meanwhile, an oven having an inert (argon) atmosphere is preheated to 1000° C. The upside down, powder-coated brake disc is placed into the preheated oven having an inert (argon) atmosphere. An electrical current is applied to the powder-coated carbon-carbon composite brake disc in order to begin a combustion reaction. The electric current is 1000 Amps, which is applied for 2 seconds. Combustion occurs spontaneously, and raised the temperature at the surface of the brake disc to more than 3000° C. The combustion is a chemical reaction between the tungsten and carbon in the carbon-carbon composite brake disc. The product of the combustion is tungsten carbide (WC). The WC formed in this way is liquid, and small amounts of the WC melt flows into pores in the underside surface of the composite brake disc. The heat of the reaction is rapidly absorbed by the carbon-carbon composite, lowering the temperature of the reaction product. As the liquid reaction product material cools below 3400° C., the liquid "freezes," bonding the titanium carbide into the pores of the carbon-carbon composite brake disc. Once the carbon-carbon composite brake disc is protected in this manner, antioxidant solution is applied to it in the manner described above.

Example 5

An aircraft brake disc is turned upside down in a horizontal plane, and titanium particles having an average diameter of 200 microns are dusted onto the flat surface (the underside of the brake disc) from a "salt shaker" type dispenser. Meanwhile, an oven having an inert (argon) atmosphere is preheated to 1000° C. The upside down, powder-coated brake disc is placed into the preheated oven having an inert (argon) atmosphere. An electrical current is applied to the powder-coated carbon-carbon composite brake disc in order to begin a combustion reaction. The electric current is 1000 Amps, which is applied for 2 seconds. Combustion occurs spontaneously, and raised the temperature at the surface of the brake disc to more than 3000° C. The combustion is a chemical reaction between the titanium and carbon in the carbon-carbon composite brake disc. The product of the combustion is titanium carbide. The TiC formed in this way is liquid, and small amounts of the titanium carbide melt flows into pores in the underside surface of the composite brake disc. The heat of the reaction is rapidly absorbed by the carbon-carbon composite, lowering the temperature of the reaction product. As the liquid reaction product material cools below 2500° C., the liquid "freezes," bonding the titanium carbide into the pores of the carbon-carbon composite brake disc. Once the carbon-carbon composite brake disc is protected in this manner, antioxidant solution is applied to it in the manner described above.

The invention being thus described, it will be manifest to persons skilled in the art that the same may be varied in many ways. Such variations are not to be regarded as a departure from the spirit and scope of the invention, and all such modifications as would be obvious to one skilled in the art are intended to be included within the scope of the following claims.

What is claimed is:

1. A method comprising:
    applying a metal powder, selected from the group consisting of titanium powder and tungsten powder, to a non-friction surface of a porous carbon-carbon composite brake disc;
    instituting a chemical reaction by an application of electric current to the metal powder, thereby instituting a combustion reaction that forms titanium carbide or tungsten carbide within pores of the non-friction surface of the carbon-carbon composite brake disc; and subsequently applying an anti-oxidant solution to the non-friction surface of the resulting carbon-carbon composite brake disc.

2. The method of claim 1, wherein an average particle diameter of the titanium or tungsten powder ranges from 10 to 300 microns.

3. The method of claim 1, wherein the metal powder is titanium powder and the combustion reaction begins at approximately 1725° C.

4. The method of claim 1, wherein the metal powder is tungsten powder and the combustion reaction begins at approximately 3422° C.

5. The method of claim 1, wherein instituting the chemical reaction comprises applying an electric current of from 500 to 1000 Amps to the metal powder.

6. The method of claim 1, wherein the metal powder is titanium powder, the method further comprising preheating an oven to 1000° C., wherein instituting the chemical reaction further comprises placing the carbon-carbon composite brake disc and the titanium powder in the preheated oven.

7. The method of claim 1, wherein an average particle diameter of the titanium or tungsten powder particles is about 200 microns.

8. The method of claim 1, wherein an average particle diameter of the titanium or tungsten powder particles is about 45 microns.

9. The method of claim 1, wherein an average particle diameter of the titanium or tungsten powder particles is about 20 microns.

10. The method of claim 1, wherein instituting the chemical reaction comprises applying an electric current of about 700 Amps to the metal powder.

11. The method of claim 1, wherein initiating the chemical reaction further comprises heating the carbon-carbon composite brake disc.

12. The method of claim 11, wherein heating the carbon-carbon composite brake disc comprises heating the carbon-carbon composite brake disc to a temperature of about 1000° C.

13. The method of claim 11, wherein applying the electric current comprises applying an electric current between about 500 Amps and about 1000 Amps to the metal powder.

14. A method of manufacturing an aircraft brake disc, the method comprising:
    applying tungsten or titanium particles having an average diameter that ranges from 10 microns to 300 microns onto a non-friction surface of a carbon-carbon composite aircraft brake disc, the non-friction surface being presented in a horizontal plane to define an upper surface;
    subsequently placing the carbon-carbon composite aircraft brake disc into a preheated oven having an inert atmosphere;
    initiating a combustion reaction comprising a reaction between the tungsten or titanium and carbon present in the carbon-carbon composite aircraft brake disc, the combustion reaction forming tungsten carbide or titanium carbide in liquid form;
    permitting the liquid tungsten carbide or the liquid titanium carbide to flow into pores in the non-friction surface of the carbon-carbon composite aircraft brake disc;
    permitting the liquid tungsten carbide or the liquid titanium carbide to solidify within the pores, thereby imparting to the non-friction surface of the carbon-carbon composite aircraft brake disc a resistance to potential migration of anti-oxidant solution through the porosity of the carbon-carbon composite aircraft brake disc; and subsequently applying an anti-oxidant solution to the non-friction surface of the carbon-carbon composite aircraft brake disc.

15. The method of claim 14, wherein initiating the combustion reaction comprises applying an electrical current to the carbon-carbon composite aircraft brake disc for a period of time sufficient to initiate the combustion reaction.

16. The method of claim 15, wherein applying the electrical current to the carbon-carbon composite aircraft brake disc comprises applying a 500-1000 Amp current for 2-10 seconds.

17. The method of claim 14, wherein the average diameter of the titanium or tungsten particles ranges from 20 to 200 microns.

* * * * *